United States Patent
Clarkson

(10) Patent No.: US 8,605,941 B2
(45) Date of Patent: Dec. 10, 2013

(54) ENHANCED DETECTION OF GESTURE

(75) Inventor: Ian Clarkson, Ottawa (CA)

(73) Assignee: Qualcomm Incorporated, San Diego, CA (US)

(*) Notice: Subject to any disclaimer, the term of this patent is extended or adjusted under 35 U.S.C. 154(b) by 821 days.

(21) Appl. No.: 12/508,645

(22) Filed: Jul. 24, 2009

(65) Prior Publication Data

US 2010/0040292 A1  Feb. 18, 2010

Related U.S. Application Data

(60) Provisional application No. 61/083,605, filed on Jul. 25, 2008.

(51) Int. Cl.
*G06K 9/00* (2006.01)
(52) U.S. Cl.
USPC .......................................... 382/103; 715/863
(58) Field of Classification Search
CPC . G06K 9/00335; G06K 9/00355; G06F 3/017
USPC .......... 382/100, 103, 201, 187, 107; 715/863
See application file for complete search history.

(56) References Cited

U.S. PATENT DOCUMENTS

| | | | |
|---|---|---|---|
| 5,452,371 A | 9/1995 | Bozinovic et al. | |
| 5,523,775 A | 6/1996 | Capps | |
| 5,687,254 A | 11/1997 | Poon et al. | |
| 6,160,899 A | 12/2000 | Lee et al. | |
| 6,215,890 B1 | 4/2001 | Matsuo et al. | |
| 6,256,400 B1 | 7/2001 | Takata et al. | |
| 6,984,208 B2 | 1/2006 | Zheng | |
| 7,129,927 B2 | 10/2006 | Mattsson | |
| 7,308,112 B2 * | 12/2007 | Fujimura et al. | 382/103 |
| 7,340,077 B2 | 3/2008 | Gokturk et al. | |
| 7,460,690 B2 * | 12/2008 | Cohen et al. | 382/103 |
| 7,598,942 B2 | 10/2009 | Underkoffler et al. | |
| 7,721,207 B2 * | 5/2010 | Nilsson | 715/707 |
| 7,877,707 B2 | 1/2011 | Westerman et al. | |
| 8,007,110 B2 * | 8/2011 | Dunn et al. | 353/28 |
| 8,146,020 B2 | 3/2012 | Clarkson | |
| 2002/0041327 A1 | 4/2002 | Hildreth et al. | |

(Continued)

FOREIGN PATENT DOCUMENTS

| JP | 2001111881 A | 4/2001 | H04N 5/232 |
|---|---|---|---|
| JP | 2007172577 A | 7/2007 | G06F 3/01 |
| JP | 2007189664 A | 7/2007 | H04N 5/00 |

OTHER PUBLICATIONS

International Search Report & Written Opinion issued in International Application No. PCT/US09/51698, mailed Sep. 3, 2009, 12 pages.

(Continued)

*Primary Examiner* — Andrew W Johns
(74) *Attorney, Agent, or Firm* — Kilpatrick Townsend & Stockton LLP

(57) ABSTRACT

The enhanced detection of a waving engagement gesture, in which a shape is defined within motion data, the motion data is sampled at points that are aligned with the defined shape, and, based on the sampled motion data, positions of a moving object along the defined shape are determined over time. It is determined whether the moving object is performing a gesture based on a pattern exhibited by the determined positions, and an application is controlled if determining that the moving object is performing the gesture.

24 Claims, 10 Drawing Sheets

(56) References Cited

U.S. PATENT DOCUMENTS

| | | |
|---|---|---|
| 2002/0064382 A1 | 5/2002 | Hildreth et al. |
| 2003/0058111 A1 | 3/2003 | Lee et al. |
| 2003/0167908 A1 | 9/2003 | Nishitani et al. |
| 2004/0193413 A1* | 9/2004 | Wilson et al. .................. 704/243 |
| 2005/0196015 A1* | 9/2005 | Luo et al. ....................... 382/103 |
| 2006/0010400 A1 | 1/2006 | Dehlin et al. |
| 2006/0098873 A1 | 5/2006 | Hildreth et al. |
| 2006/0210112 A1 | 9/2006 | Cohen et al. |
| 2006/0281453 A1 | 12/2006 | Jaiswal et al. |
| 2007/0124702 A1 | 5/2007 | Morisaki ........................ 715/863 |
| 2008/0030460 A1 | 2/2008 | Hildreth et al. |
| 2008/0141181 A1* | 6/2008 | Ishigaki et al. ................ 715/863 |
| 2009/0027337 A1 | 1/2009 | Hildreth |
| 2010/0211902 A1 | 8/2010 | Unsworth et al. |
| 2012/0151421 A1 | 6/2012 | Clarkson |

OTHER PUBLICATIONS

International Search Report & Written Opinion issued in International Application No. PCT/US2009/051688, mailed Sep. 15, 2009, 11 pages.

Nisikawa A, "Recognition of Human Gestures from Optical Flow Based on a Correlation Method Between Local Image Regions", IPSJ Journal, Japan, Information Processing Society of Japan, Aug. 15, 1999, vol. 40(8), 3118-3133.

* cited by examiner

ENHANCED DETECTION OF GESTURE

CROSS REFERENCE TO RELATED APPLICATIONS

This application claims the benefit of U.S. Provisional Patent Application No. 61/083,605, filed Jul. 25, 2008, which is incorporated herein by reference in its entirety.

FIELD

The present disclosure generally relates to user input.

BACKGROUND

Cameras have been used to capture images of objects. Techniques have been developed to analyze one or more images of an object present within the one or more images to detect a position of the object. For example, optical flow has been used to detect motion of an object by analyzing multiple images of the object taken successively in time.

SUMMARY

According to one general implementation, a position of a moving object may be tracked over time along a shape defined within motion data. When the position of the object (expressed as a proportion of a single dimension of the shape) is graphed over time, it may be determined that the moving object is performing a waving, swiping or oscillating gesture if the graphed position exhibits a shape generally resembling one or more periods of a sinusoid. Such a gesture may be mapped to a control input, improving the accuracy of a human-computer interface.

According to another general implementation, a computer-readable medium is encoded with a computer program including instructions that, when executed, operate to cause a computer to perform operations. The operations include defining a shape within motion data, sampling the motion data at points that are aligned with the defined shape, and determining, based on the sampled motion data, positions of a moving object along the defined shape, over time. The operations also include determining whether the moving object is performing a gesture based on a pattern exhibited by the determined positions, and controlling an application if determining that the moving object is performing the gesture.

Implementations may include one or more of the following features. For instance, the motion data may include a motion history map further including motion history data values that provide, for each point of an image, an indication of time since the moving object was detected at the point. Determining the positions of the moving object along the defined shape, over time, may further include, at first and second times, selecting points that are aligned with the defined shape and that include sampled motion history data values which satisfy a predetermined threshold, and selecting one of the selected points. Determining the positions of the moving object may also include outputting, as first and second positions of the moving object, the one points respectively selected at the first and second times. The one point may be a median, mean, or random point of the selected points. The operations may also include accessing the image, and generating the motion history data values included in the motion history map based on the accessed image. The motion history map may be generated using optical flow.

In other examples, the pattern includes a shape of one period of a sinusoid or a stepped sinusoid on a graph of the determined positions over time, the determined positions expressed as a proportion of a single dimension of the shape. The operations may also include determining, for each point, whether the moving object has been detected within a predetermined threshold, and grouping adjacent points determined to have detected motion of the moving object within the predetermined threshold, where the motion data may be sampled at a subset of the grouped points that are aligned with the defined shape. The operations may also include defining a bounding box around the grouped points, where a size and a location of the shape within the motion data are defined with respect to the bounding box. The shape may be a line segment or a chord, such as a longest line segment capable of fitting within the grouped points.

In further examples, the operations may include detecting groups of points within the motion data, and selecting one of the groups of points, where the shape is defined within the one selected group. The one group may be selected based on relative size. The motion data may be sampled at a sampled quantity of points that are aligned with the defined shape, and the sampled quantity may include a fixed quantity or may be based on a size of the defined shape or an aligned quantity of points that are aligned with the defined shape within the motion data. Determining whether the moving object is performing the gesture based on the pattern exhibited by the determined positions may further include comparing the pattern to upper and lower threshold criteria and to timing criteria. The gesture may be a swiping or waving, hand or finger gesture. The operations may further include adding the determined positions to a motion history, and detecting whether the pattern exists within the motion history, or counting a quantity of performances of the gesture.

In another general implementation, a process includes defining a shape within motion data, sampling the motion data at points that are aligned with the defined shape, and determining, based on the sampled motion data, positions of a moving object along the defined shape, over time. The process may also include determining whether the moving object is performing a gesture based on a pattern exhibited by the determined positions, and controlling an application if determining that the moving object is performing the gesture.

In a further general implementation, a device includes a processor configured to define a shape within motion data, to sample the motion data at points that are aligned with the defined shape, and to determine, based on the sampled motion data, positions of a moving object along the defined shape, over time. The processor is further configured to determine whether the moving object is performing a gesture based on a pattern exhibited by the determined positions, and to control an application if determining that the moving object is performing the gesture.

Implementations of any of the techniques described above may include a method, a process, a system, a device, an apparatus, an interaction interface, instructions stored on a computer-readable medium, or a computer-readable medium encoded with a computer program. The details of one or more implementations are set forth in the accompanying drawings and the description below. Other features will be apparent from the description and drawings, and from the claims.

BRIEF DESCRIPTION OF THE DRAWINGS

Like reference numbers represent corresponding parts throughout.

DETAILED DESCRIPTION

Figure 1A:
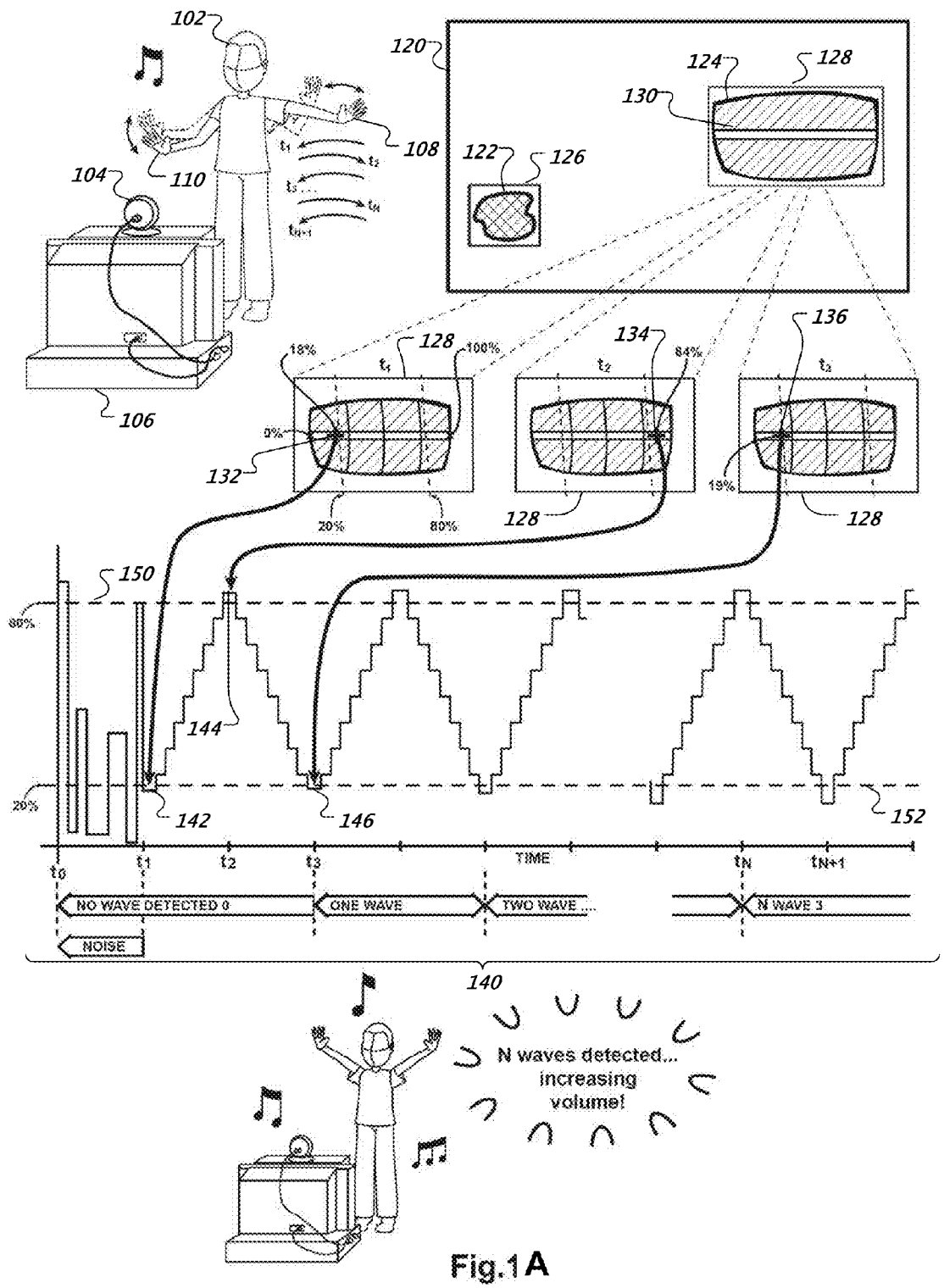
FIGS. 1A and 1B illustrate a contextual diagram demonstrating gesture recognition, and an associated motion history value graph used for determining an object position.

According to one general implementation, a position of a moving object may be tracked over time along a shape defined within motion data. When the position of the object (expressed as a proportion of a single dimension of the shape) is graphed over time, it may be determined that the moving object is performing a waving, swiping or oscillating gesture if the graphed position exhibits a shape generally resembling one or more periods of a sinusoid. Such a gesture may be mapped to a control input, improving the efficacy and accuracy of a human-computer interface.

In doing so, and instead of selecting a control on a user interface, a user may move through a series of motions that define a gesture (e.g., move their hand or other body part), in order to invoke certain functionality that is associated with that gesture. As such, functions may be implemented without requiring the use of physical buttons or user interface controls, allowing smaller user interfaces and effecting increased accuracy in functionality selection. Furthermore, by using camera-based input, the deleterious blurring effect of fingerprints on a touch-screen is eliminated, since the user is not required to physically touch any device in order to effect a control input.

Thus, in one example, a user interacts with a device by performing a set of defined gestures. An enhanced approach is provided, in which an input gesture is either recognized or rejected based on whether motion data sampled at points aligned with a shape defined within the motion data exhibits an expected pattern.

As used herein throughout, a "gesture" is intended to refer to a form of non-verbal communication made with part of a human body, and is contrasted with verbal communication such as speech. For instance, a gesture may be defined by a movement, change or transformation between a first position, pose, or expression and a second pose, position or expression. Common gestures used in everyday discourse include for instance, an "air quote" gesture, a bowing gesture, a curtsey, a cheek-kiss, a finger or hand motion, a genuflection, a head bobble or movement, a high-five, a nod, a sad face, a raised fist, a salute, a thumbs-up motion, a pinching gesture, a hand or body twisting gesture, or a finger pointing gesture.

A gesture may be detected using a camera, such as by analyzing an image of a user, using a tilt sensor, such as by detecting an angle that a user is holding or tilting a device, sensing motion of a device, or by any other approach. Gestures may be formed by performing a series of motions in a particular pattern or fashion.

Although the enhanced approach described herein is described using an example waving gesture, in other implementations any other shape or type of gesture (such as the example gestures described above) may be detected as well. Furthermore, although the example waving gesture is described as being an "engagement" gesture, in other implementations a gesture detected using this enhanced approach has a purpose other than being an "engagement gesture." Further description of an "engagement" gesture (as opposed to a gesture intended to define an actual command input) is described in further detail below.

A user may make a gesture (or may "gesture" or "gesticulate") by changing a position of a body part (e.g., a waving motion), or a user may gesticulate without changing a position of a body part (e.g., by making a clenched fist gesture, or by holding a body part immobile for a period of time). Although the enhanced approach uses, as examples, finger, hand and arm gestures, other types of gestures may also be used. For example, if the motion of a user's eye is tracked, the enhanced approach described herein may be used to detect a left-and-right "eye scanning" gesture.

Figure 1B:
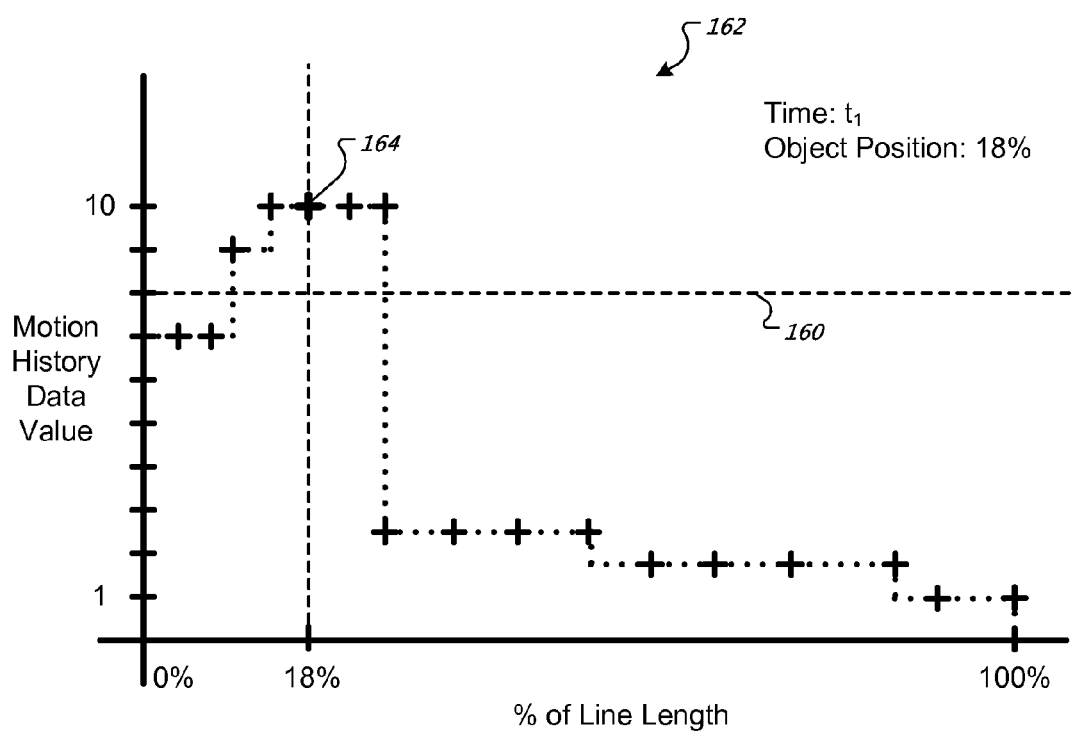

FIG. 1A is a contextual diagram demonstrating gesture recognition, and FIG. 1B is an associated motion history value graph used for determining an object position at a particular time. A user 102 is standing in front of a camera 104 and a media hub 106. The media hub 106 may be, for example, a computer that is playing a musical recording. The user 102 moves their left hand 108 in a back-and-forth waving motion (e.g., the user may be making a swiping or waving, hand or finger gesture). For example, at a time point $t_1$ the user moves their hand 108 in towards their body, at a time point $t_2$ the user moves their hand 108 to the side (away from their body in this example, or rightward from the reader's perspective), and at a time point $t_3$ the user moves their hand 108 back in towards their body. While the user 102 performs an intentional gesture, such as the waving motion of the hand 108, the user may make other, intentional or unintentional movements, such as a wiggle or small movement of a right hand 110. This small movement of the right hand 110 may be caused by body jitter, or even movement of the camera 104 itself.

The camera 104 may take multiple images of the user 102 as time elapses. The media hub 106 may process the multiple images and generate a motion history map 120, which may indicate a user's motion over time. The motion history map 120 may provide motion data, which includes, for each point of an image, an indication of time since a moving object was detected at the point. The media hub 106 may determine, for each point in an image, whether a moving object (e.g., the hand 108) has been detected within a predetermined period of time. A number of motion history maps 120 may be generated, such as one motion history map 120 for each time point (e.g., $t_1$, $t_2$, $t_3$) in which motion is detected.

Although the motion history map 120 is illustrated as a visual grid of points, the motion history map 120 may exist purely as a data structure on a computer-readable medium, without a concomitant visualization. When visualized, however, points on the motion history map 120 may appear as bright spots (representing high values) where recent motion was detected, fading over time to black as time elapses without the occurrence of additional motion. At a particular moment in time, for example, a swiping hand motion may appear as a bright spot where the user's hand is detected most recently, followed by a trail which fades to black where the swiping hand motion began.

Adjacent points in a motion history map 120 determined to have detected motion may be grouped for processing as a single group, cluster or "blob." By isolating the points as a group, computational expense may be minimized. Points determined to have motion as a result of the movement of the right hand 110 may be grouped as a group of points 122. As another example, points determined to have motion as a result of the movement of the left hand 108 may be grouped as a group of points 124.

For each group of points, a bounding box may be defined around the group. For example, a bounding box 126 is defined around the group of points 122 and a bounding box 128 is defined around the group of points 124. If the user starts performing a gesture while their hand is already in an upright position, the bounding box may be generally shaped as a wide rectangle. If the user starts performing the gesture while their hand is at their side, the lifting of the hand from their side to the upright position may cause the bounding box to be shaped as a tall rectangle or a square. By decreasing the persistence of the motion history (e.g. increasing the fade rate of the motion history values for each pixel), the effect of this hand lifting motion can be reduced, resulting in bounding boxes which are more wide-rectangle shaped than they are square shaped.

An intentional gesture may generally result in a larger group of points than an unintentional gesture. For example, the group of points 124 is larger than the group of points 122. In some implementations, for purposes of gesture detection, only the largest group of points may be considered as associated with a candidate gesture. In other approaches, however, the smaller group of points will be considered first, the groups of points will each be considered at the same time, or the groups will each be considered in turn based on size or other criteria. Furthermore, each group may be examined at the same time, in parallel.

A shape may be inscribed or otherwise defined inside of the motion data, where the size and location of the shape may be defined with respect to a bounding box. For example, a line segment 130 may be inscribed inside the bounding box 128 (e.g., inside the bounding box surrounding the largest group of points). The length of the line segment 130 may be based on the size of the bounding box 128. For example, the length of the line segment 130 may correspond to the length of the larger dimension of the bounding box 128. Other line segment sizes and other inscribed shapes are possible, as described in more detail below.

Motion data may be sampled using points that are aligned with the line segment 130. The sampled quantity may be a fixed quantity (e.g., 3, 64, or 10,000 samples), or the sampled quantity may be based on the length of the line segment 130 (e.g., a longer line segment may result in more sample points than a shorter line segment).

Based on the sampled motion data, the last detected position of the hand 108 along the line segment 130 may be determined. For example (and as illustrated in FIG. 1B), at the time point $t_1$ in which the user 102 moves their hand 108 to the left (from the reader's perspective), there may be relatively high motion history data values on the left side of the line segment 130. That is, the left side of the line segment 130 may have values indicating the most recent motion of the hand 108. Less recent motion may be filtered out or otherwise ignored by applying a threshold 160 to points sampled along the line segment 130. Sampled points that have a motion history data value less than a threshold may be filtered.

The position of the hand 108 may be identified by selecting a point from the remaining unfiltered points 162. For example, a region of unfiltered points may be determined, and a median point 164 (corresponding to the 18% position along the line) within the region may be selected. Other example point selection approaches include selecting a point on an edge of the region that includes unfiltered points, selecting a random point, selecting a point that has the highest motion history data value among unfiltered points, or selecting a point that has a motion history data value equal to the average motion history data value among unfiltered points.

The detected position of the hand may be expressed as a percentage of the length of the line segment 130. For example, a detected position of 0% corresponds to a position on the far left side of the line segment 130. A detected position of 100% corresponds to a position on the far right side of the line segment 130. Detected hand positions corresponding to the waving motion of the hand 108 include a detected hand position 132 of 18% for the time point $t_1$, a detected hand position 134 of 84% for the time point $t_2$, and a detected hand position 136 of 19% for the time point $t_3$.

Hand positions detected over time may be plotted on a graph 140. For example, the graph 140 includes graph points 142-146, corresponding to the detected hand positions 132-136, respectively. The graph 140 includes an upper threshold position 150 of 80% and a lower threshold position 152 of 20%. The threshold positions 150-152 may be used to determine whether a user's motion constitutes a wave.

For example, for a wave to occur, the user 102 may move their hand leftward to less than the lower threshold position 152 (i.e., less than the 20% position, such as illustrated by the point 142 corresponding to the time point $t_1$), then in the opposite direction to greater than the upper threshold position 150 (i.e., greater than the 80% position, such as illustrated by the point 144 corresponding to the time point $t_2$), and then back leftward again to at least the lower threshold position 152 (such as illustrated by the point 146 corresponding to the time point $t_3$). Depending on where the user 102 begins their motion, a wave may also occur by a user first crossing the upper threshold position 150.

One or more wave gestures may be detected if the graph 140 exhibits a sinusoidal pattern. One wave gesture may correspond to a period of a sinusoid. For example, the graph portion from point 142 to point 146 is one period of a sinusoid, and therefore corresponds to one wave gesture. That is, a wave gesture is detected at the time point $t_3$, after the user 102 moves their hand 108 back to the left, past the lower threshold position 152. If the user continues to gesture in a back and forth manner, multiple wave gestures may be detected, one for each sinusoidal period of the graph 140.

In response to the detection of one or more wave gestures, an application may be controlled. For example, the volume of the music playing on the media hub 106 may be increased. A function to perform in response to a gesture may be determined, for example, by querying a mapping database which maps gestures to functions. The number of waves detected may be provided as input to a performed function. For example, the number of waves detected may indicate an amount to raise the volume by. As another example, the user 102 may wave five times to provide an input to the media hub 106 to have a television channel switched to a channel number "5," or to perform another operation using a factor of "5." In addition to media functions, the detection of one or more wave gestures may cause a computer to invoke any functionality whatsoever, for example after consulting a look-up table, where the number of counted waves may be used as an input to the look-up table.

Figure 2:
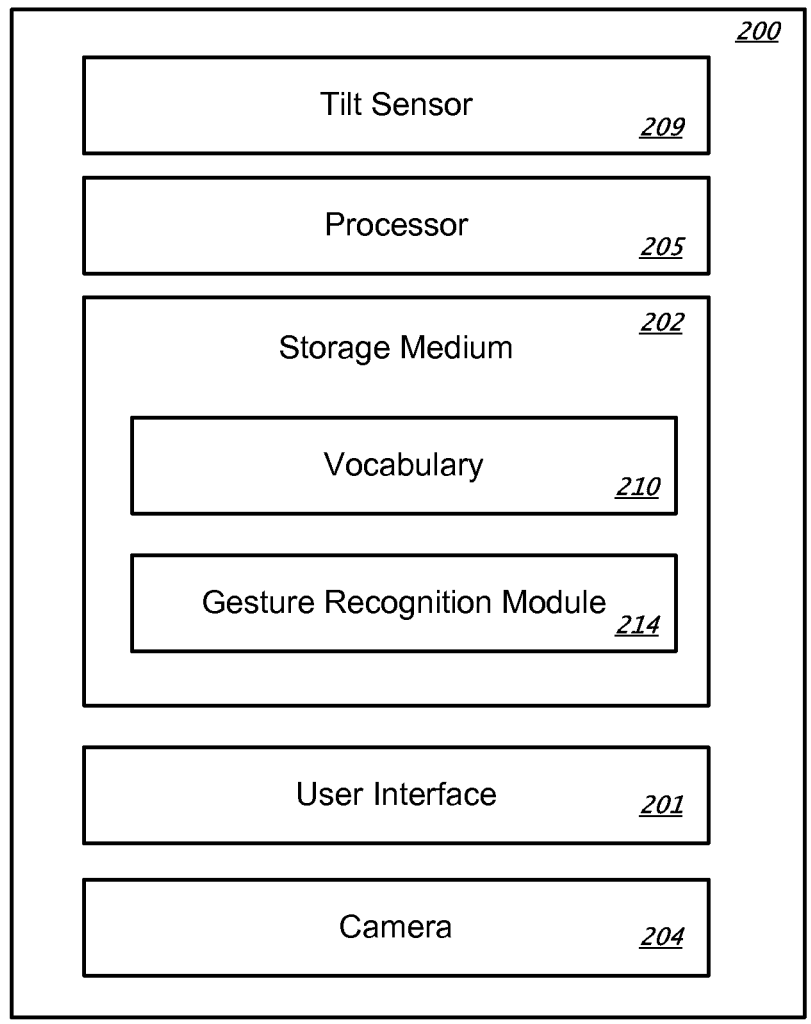
FIG. 2 is a block diagram of a device.

FIG. 2 is a block diagram of a device 200 used to implement gesture recognition. Briefly, and among other things, the device 200 includes a user interface 201, a storage medium 202, a camera 204, a processor 205, and a tilt sensor 209.

The user interface 201 is a mechanism for allowing a user to interact with the device 200, or with applications invoked by the device 200. The user interface 201 may provide a mechanism for both input and output, allowing a user to manipulate the device or for the device to produce the effects of the user's manipulation. The device 200 may utilize any type of user interface 201, such as a graphical user interface (GUI), a voice user interface, or a tactile user interface.

The user interface 201 may be configured to render a visual display image. For example, the user interface 201 may be a monitor, a television, a liquid crystal display (LCD), a plasma display device, a projector with a projector screen, an autostereoscopic display, a cathode ray tube (CRT) display, a digital light processing (DLP) display, or any other type of display device configured to render a display image. The user interface 201 may include one or more display devices. In some configurations, the user interface 201 may be configured to display images associated with an application, such as display images generated by an application, including an object or representation such as an avatar.

The storage medium 202 stores and records information or data, and may be an optical storage medium, magnetic storage medium, flash memory, or any other storage medium type. Among other things, the storage medium is encoded with a vocabulary 210 and a gesture recognition module 214.

The vocabulary 210 includes information regarding gestures that the device 200 may recognize. For example, the vocabulary 210 may include gesture definitions which describe, for each recognized gesture, a shape corresponding to the gesture (i.e. a line), a pattern which a graph of sampled motion history data is expected to exhibit, along with various threshold parameters or criteria which may be used to control gesture acceptance or rejection.

The gesture recognition module 214 receives motion data captured by a motion sensor (e.g., the camera 204 and/or the tilt sensor 209) and compares the received motion data to motion data stored in the vocabulary 210 to determine whether a recognizable gesture has been performed. For example, the gesture recognition module may plot motion history data values sampled along a shape inscribed in received motion data and compare the resultant graph to an expected graph stored in the vocabulary 210.

The camera 204 is a device used to capture images, either as still photographs or a sequence of moving images. The camera 204 may use the light of the visible spectrum or with other portions of the electromagnetic spectrum, such as infrared. For example, the camera 204 may be a digital camera, a digital video camera, or any other type of device configured to capture images. The camera 204 may include one or more cameras. In some examples, the camera 204 may be configured to capture images of an object or user interacting with an application. For example, the camera 204 may be configured to capture images of a user or person physically gesticulating in free-space (e.g., the air surrounding the user), or otherwise interacting with an application within the field of view of the camera 204.

The camera 204 may be a stereo camera, a time-of-flight camera, or any other camera. For instance the camera 204 may be an image detector capable of sampling a background image in order to detect motions and, similarly, gestures of a user. The camera 204 may produce a grayscale image, color image, or a distance image, such as a stereo camera or time-of-flight camera capable of generating a distance image. A stereo camera may include two image sensors that acquire images at slightly different viewpoints, where a processor compares the images acquired from different viewpoints to calculate the distance of parts of the images. A time-of-flight camera may include an emitter that generates a pulse of light, which may be infrared light, where the time the pulse of light travels from the emitter to an object and back to a sensor is measured to calculate the distance of parts of the images.

The device 200 is electrically connected to and in operable communication with, over a wireline or wireless pathway, the camera 204 and the user interface 201, and is configured to control the operation of the processor 205 to provide for the enhanced control. In one configuration, the device 200 uses the processor 205 or other control circuitry to execute an application that provides for enhanced camera-based input.

Although the camera 204 may be a separate unit (such as a webcam) that communicates with the device 200, in other implementations the camera 204 is built into the device 200, and communicates with other components of the device 200 (such as the processor 205) via an internal bus. For example, the camera 204 may be built into a television or set-top box.

Although the device 200 has been described as a personal computer (PC) or set top box, such a description is made merely for the sake of brevity, and other implementations or manifestations are also contemplated. For instance, the device 200 may be implemented as a television, an ultra-mobile personal computer (UMPC), a mobile internet device (MID), a digital picture frame (DPF), a portable media player (PMP), a general- or special-purpose computer (e.g., a desktop computer, a workstation, or a laptop computer), a server, a gaming device or console, or any other type of electronic device that includes a processor or other control circuitry configured to execute instructions, or any other apparatus that includes a user interface.

In one example implementation, input occurs by using a camera to detect images of a user performing gestures. For instance, a mobile phone may be placed on a table and may be operable to generate images of a user using a face-forward camera. For example, a detected "left swipe" gesture may pan an image leftwards, and a detected "right swipe" gesture may pan an image rightwards. Alternatively, the gesture may be recognized or detected using the tilt sensor 209, such as by detecting a "tilt left" gesture to move a representation left and to pan an image left or rotate an image counter-clockwise, or by detecting a "tilt forward and right" gesture to move a representation up and to the right of a neutral position, to zoom in and pan an image to the right.

The tilt sensor 209 may thus be any type of module operable to detect an angular position of the device 200, such as a gyroscope, accelerometer, or a camera-based optical flow tracker. In this regard, image-based input may be supplemented with or replaced by tilt-sensor input to perform functions or commands desired by a user. Put another way, detection of a user's gesture may occur without using a camera, or without detecting the user within the images. By moving the device in the same kind of stroke pattern as the user desires to manipulate the image on the user interface, the user is enabled to control the same interface or application in a straightforward manner.

Figure 3:
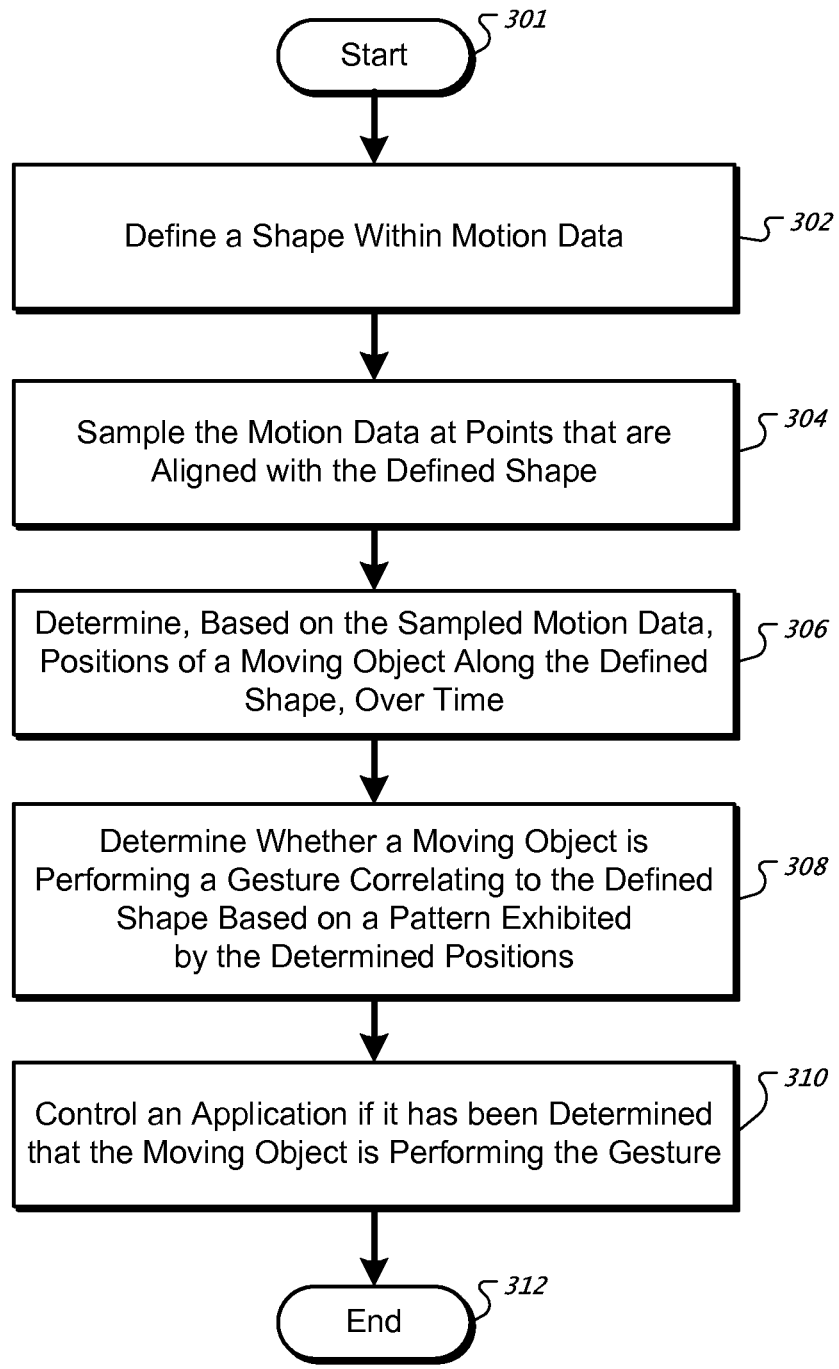
FIG. 3 is a flowchart of an exemplary process.

FIG. 3 is a flowchart illustrating a computer-implemented process 300 that effects functionality invocation in response to recognized gestures. Briefly, the computer-implemented process 300 includes: defining a shape within motion data; sampling the motion data at points that are aligned with the defined shape; determining, based on the sampled motion data, positions of a moving object along the defined shape, over time; determining whether a moving object is performing a gesture correlating to the defined shape based on a pattern exhibited by the determined positions, and controlling an application if it has been determined ("if determining") that the moving object is performing the gesture.

In further detail, when the process 300 begins (S301), a shape is defined within motion data (S302). Motion data may be provided by a motion history map (e.g., map 120, FIG. 1). The motion history map may be created from multiple images of a user taken over time. The motion history map may indicate a user's motion over time, and may provide motion data, which includes, for each point of an image, an indication of time since a moving object was detected at the point. The shape may be defined within the motion data without visualizing either the shape or the motion data on a user interface.

The motion data may include groups of adjacent points determined to have motion. For each group of points, a bounding box may be defined around the group. Since an intentional gesture will generally result in a larger group of points than an unintentional gesture, in some implementations, for purposes of gesture detection, only the largest group of points may be considered as associated with a candidate gesture. In other approaches, however, the smaller group of points will be considered first, the groups of points will each be considered at the same time, or the groups will each be considered in turn based on size or other criteria.

Figure 4:
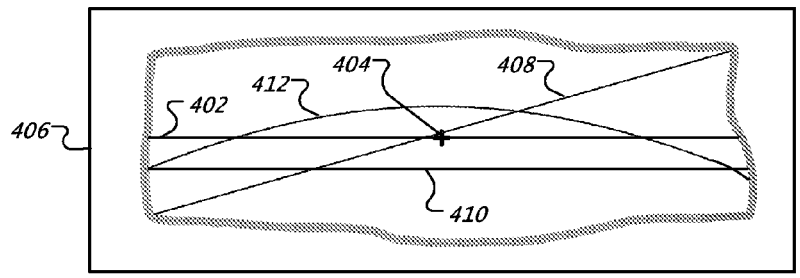
FIG. 4 illustrates example inscribed shapes.

A shape, such as a line segment, may be inscribed or otherwise defined inside of the motion data, where the size and location of the shape may be defined with respect to the largest bounding box. For example, and as shown in FIG. 4, a horizontal line segment 402 may be defined which passes through a center 404 of a bounding box 406. Other line segments may be defined, such as a line segment 408 or a line segment 410. The line segment 408 is the longest line segment capable of fitting within the grouped points inside of the bounding box 406. The line segment 410 is the longest horizontal line segment capable of fitting within the grouped points inside of the bounding box 406. Other shapes may be defined, such as an arc 412. The arc 412 may resemble a slightly curved motion of a user's hand waving back and forth.

Returning to FIG. 3, after a shape has been defined, the motion data is sampled at points that are aligned with the defined shape (S304). For example, sample points may be aligned along the edge of an inscribed line segment. The sampled quantity may be a fixed quantity (e.g., 1000 samples), or the sampled quantity may be based on the size of the shape (e.g., a larger shape may result in more sample points than a smaller shape). The sampled points may be spaced at a fixed and/or predetermined distance apart from each other. In some implementations, after a particular gesture has been recognized at least once, smaller sample sizes may be used.

After the motion data is sampled, positions of a moving object along the defined shape are determined over time (S306), based on the sampled motion data. For example, positions of a hand along a defined line segment may be determined. Sampled points taken in the area of the last position of a user's hand will generally have relatively high motion data history values (e.g., indicating the most recent motion of the user's hand). Less recent motion may be filtered out or otherwise ignored by applying a threshold test to points sampled along the line segment. Sampled points that have a motion history data value less than a threshold may be filtered (See FIG. 1B).

The latest position of the users hand may be identified by selecting a point from the remaining unfiltered points. For example, a region of unfiltered points may be determined, and a median point within the region may be selected. Other example point selection approaches include selecting a point on an edge of the region that includes unfiltered points, selecting a random point, selecting a point that has the highest motion history data value among unfiltered points, or selecting a point that has a motion history data value equal to the average motion history data value among unfiltered points.

The detected position of the hand may be expressed as a percentage of the length of the line segment. For example, a detected position of 0% may correspond to a position on the far left side of the line segment. A detected position of 100% may correspond to a position on the far right side of the line segment. The detected position may be stored in a history of detected positions. Because the definition of the shape within the motion data is dynamic, a user's hand motion past an endpoint of the shape previously designated as the 0% or 100% position causes the shape to be extended and the more extreme hand position to be designated as the new 0% or 100% position.

After the positions of the moving object are determined, it is determined whether a moving object is performing a gesture correlating to the defined shape (S308) based on a pattern exhibited by the determined positions. For example, determined hand positions may be plotted on a graph (e.g., graph 140, FIG. 1). The shape of the graph may be compared to patterns of graph shapes that are expected to occur when certain defined gestures are performed. For example, a sinusoidal pattern or a stepped sinusoidal pattern may be expected as a result of the performance of a waving gesture.

Figure 5:
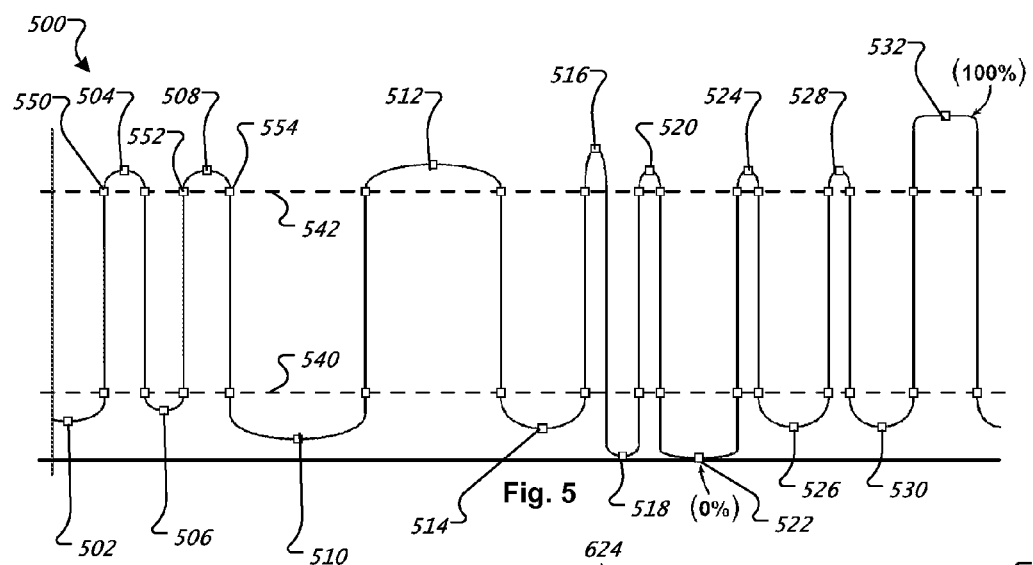
FIGS. 5-6 illustrate example graphs.

For example and as shown in FIG. 5, a graph 500 exhibits a sinusoidal pattern. The graph 500 displays plotted hand positions 502-532 which have been detected over time. The graph 500 includes seven sinusoidal periods. Therefore, up to seven wave gestures may be detected. An example sinusoidal period exists between the plotted positions 502-506.

Various tests may be performed on the graph 500 to determine whether one or more acceptable sinusoidal patterns are exhibited. For example, a test may be performed to determine whether a sinusoidal period includes a first plotted hand position at or below a lower threshold position 540 (e.g., position 502), followed by a second plotted hand position at or above an upper threshold position 542 (e.g., position 504), followed by a third plotted hand position at or below the lower threshold position 540 (e.g., position 506). For example, the following sinusoidal periods (described as a set of plotted hand positions) may be considered acceptable based on such a test: 502-506, 506-510, 510-514, 514-518, 518-522, 522-526, 526-530.

Figure 6:
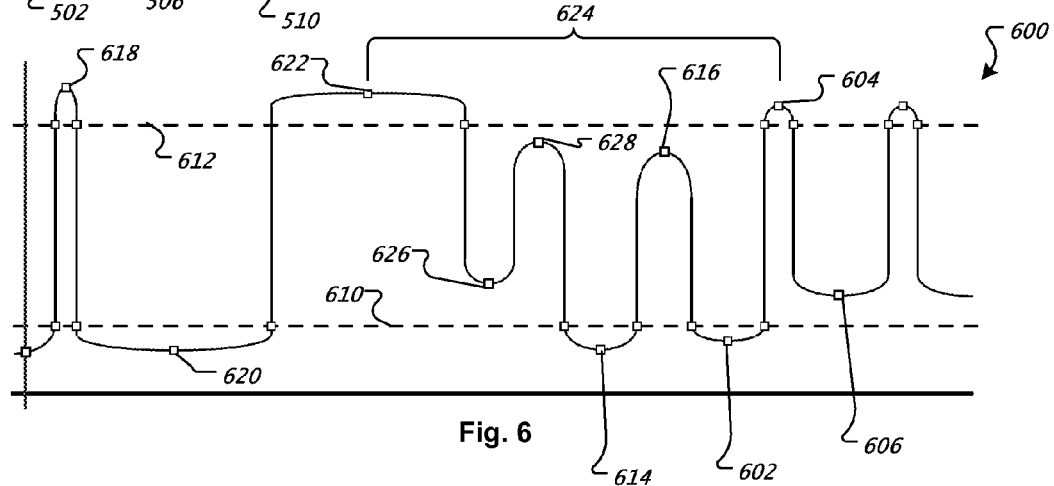

An example of a sinusoidal period which may not be accepted as corresponding to a wave gesture is shown in a graph 600 in FIG. 6. The graph 600 plots detected hand positions over time, Plotted hand positions 602-606 constitute a sinusoidal period. The plotted hand position 602 may be acceptable because it is below a lower threshold 610 and the plotted hand position 604 may be acceptable because it is above an upper threshold position 612. However, the plotted hand position 606 may be unacceptable because it is above the lower threshold position 610. The plotted hand positions 602-606 may correspond to a situation where a user's hand was initially near their body (i.e., position 602), and afterward the user moved their hand away from their body (i.e., position 604) but then moved their hand partway back towards their body (i.e., position 606). In other words, since the plotted position 606 did not cross the lower threshold position 610, it may be determined that the user did not "complete" a wave gesture.

Another example of a potentially unacceptable sinusoidal period is a sinusoidal period which includes plotted hand positions 614, 616, and 602. The plotted hand position 614 may be acceptable because it is below the lower threshold position 610. The plotted hand position 616 may be unacceptable, however, because it is not above the upper threshold position 612. The plotted hand position 602 may be acceptable because it is below the lower threshold position 610. The plotted hand positions 614, 616, and 602 correspond to a situation where the user did not "complete" a wave gesture. In other words, the user's hand was initially near their body (i.e., position 614), and afterward the user moved their hand away from their body, but only part way (i.e., position 616), and then moved their hand back towards their body (i.e., position 602).

Other threshold tests may be performed. For example, the width of a wave period may be tested. A sinusoidal period may not be accepted as corresponding to a wave gesture if the sinusoidal period is too narrow or too wide. A wide sinusoidal period, such as a sinusoidal period shown in FIG. 6 between the plotted hand positions 618, 620, and 622 may correspond to a user moving their hand back and forth slowly. Whether the sinusoidal period between hand positions 618-622 constitutes a wave may depend on a threshold value.

For example, a threshold value of three seconds may be used. A time difference between the points 622 and 618 may be calculated and compared to the threshold. If the time difference is more than the threshold, the sinusoidal period may be rejected as corresponding to a wave gesture due to the user taking too long to complete the wave gesture. As another example, a sinusoidal period between the points 510-514 in FIG. 5 may be accepted as corresponding to a wave gesture if a time difference calculated between points 514 and 510 (e.g., 2 seconds) is less than a threshold (e.g., 3 seconds).

Figure 7:
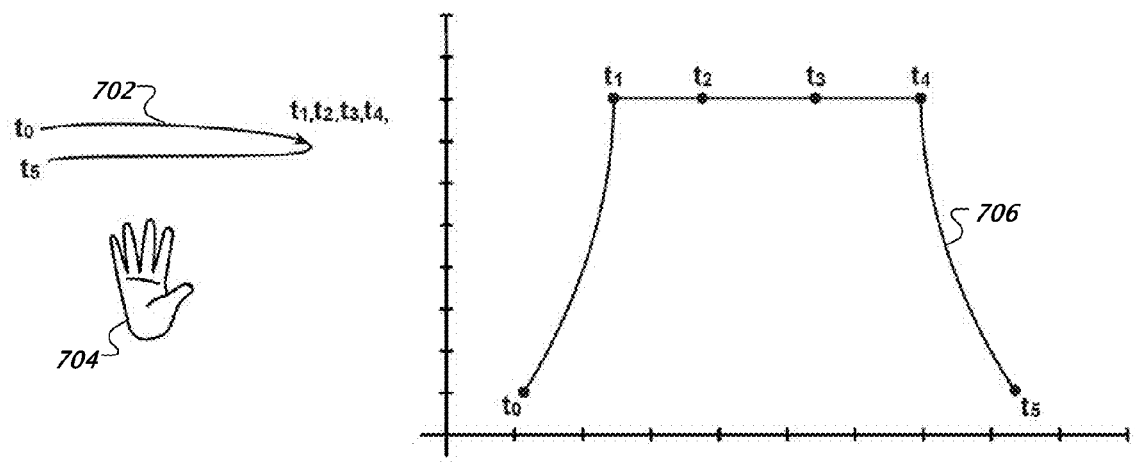
FIGS. 7-8 illustrate example gestures and associated graphs.

Another example of a wave gesture possibly taking too long to complete is shown in FIG. 7. A user makes a wave gesture 702 using their hand 704. After the user moves their hand 704 to the right at a time point $t_1$, the user pauses (e.g., holds their hand 704 still) during time points $t_2$, $t_3$, and $t_4$, and then moves their hand 704 back to the left at a time point $t_5$. A graph 706 plots detected hand positions over time. The gesture 702 may be rejected based on exceeding a timing threshold, due to the consecutive same-valued positions at the top plateau of the graph 706 (corresponding to time points $t_1$ to $t_4$) widening the sinusoidal shape of the graph 706.

Various positions along the graphs in FIGS. 5-6 may be used for threshold tests. As already discussed, a test may be performed by calculating a time difference between peaks and/or valleys of sinusoidal periods. Time differences and other calculations may also be performed based on other positions. For example, a calculation may be performed based on comparing where a sinusoidal period first crosses an upper threshold position (e.g., 542) in an upward direction (e.g., position 550) to where the sinusoidal period crosses the upper threshold position again in the same direction (e.g., 552). As another example, a threshold test may be based on comparing where a graph crosses a threshold position in one direction (e.g., crossing the upper threshold position 542 in an upward direction, as shown by position 552) to where the graph crosses the same threshold position in the other direction (e.g., as shown by position 554).

Portions of a graph may be rejected as corresponding to one or more wave gestures for more than one reason. For example, in FIG. 6, a graph portion 624 between positions 622, 614, and 604 has a value above the upper threshold position 612 (e.g., at position 622), a value below the lower threshold position 610 (e.g., at position 614) and another value above the upper threshold position 612 (e.g., at position 604). While perhaps meeting a criteria for crossing upper and lower threshold positions, the graph portion 624 may be rejected for multiple, other reasons.

For example, a timing difference based on positions 604 and 622 may exceed a threshold. In other words, it may have taken too long for the user to move their hand fully to the right a second time. The graph portion 624 may also be rejected due to violating a directionality condition. The position 626 indicates that the user reversed direction before crossing the lower threshold position 610, and the position 628 indicates that the user reversed direction again before crossing the upper threshold position 612.

Figure 8:
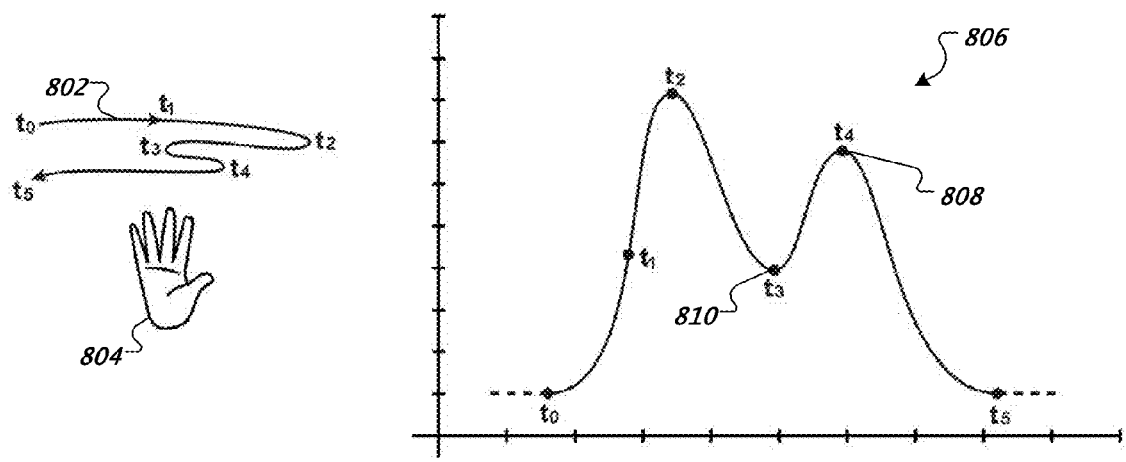

FIG. 8 illustrates a scenario where a user reverses direction before moving their hand all the way to the side. The user makes a back-and-forth gesture 802 with their hand 804. The user is moving their hand 804 to the right at a time point $t_1$, and then moves their hand 804 back to the left at a time point $t_2$. However, while roughly halfway back to the left, at a time point $t_3$, the user reverses direction and moves their hand 804 briefly back to the right, before moving their hand 804 back to the left at a time point $t_4$. At a time point $t_5$ the user's hand 804 is at the far left. A graph 806 plots detected hand positions corresponding to the gesture 802. The graph 806 may be rejected as matching a sinusoidal pattern due to a peak 808 (corresponding to the user's direction reversal at the time point $t_4$) not reaching high enough and/or a valley 810 (corresponding to the user's direction reversal at time point $t_3$) not reaching low enough.

Returning to FIG. 3, a defined gesture may be a single stroke shape. A gesture may represent an alphanumeric character (e.g., "O", "8") or some other symbol or function (e.g., the infinity symbol). Generally, a gesture is intended to refer to a movement, position, pose, or posture that expresses an idea, opinion, emotion, communication, command, demonstration or expression. A user may gesture while holding a hand-held device, or the user may gesture using one or more body parts while wearing a device on a part of their body. For instance, the user's gesture may be a single or multiple finger gesture; a single hand gesture; a single hand and arm gesture; a single hand and arm, and body gesture; a bimanual gesture; a head pose or posture; an eye position; a facial expression; a body pose or posture, or any other expressive body state.

A user's gesture may be expressive of an enabling or "engagement" gesture. The engagement gesture may be a specific hand pose or hand motion sequence gesticulated that is held for a predetermined amount of time. One example engagement gesture is the user holding a hand-held device immobile for three seconds. Another example is a circular hand motion made while holding a hand-held device by the user extending their arm in front of their face, and moving their arm in a circle in front of their head. As another example, an engagement gesture may be a user shaking a device. In essence, an engagement gesture specifies to a device that the user is ready for further input to occur. To reduce errors, an engagement gesture may be an atypical gesture, such as a gesture that would not subconsciously be made with body language during a normal conversation, or a gesture that would not be made in the ordinary performance of normal human activity.

A gesture may be derived that defines an idea, opinion, emotion, communication, command, demonstration or expression of the user. For instance, the users gesture may be a single or multiple finger gesture; a single hand gesture; a single hand and arm gesture; a single hand and arm, and body gesture; a bimanual gesture; a change in head pose or posture; a change in an eye position; a change in a facial expression; a movement of a hand while holding a device; a change in a body pose or posture, or a transformation of any other expressive body state.

For brevity, the body part or parts used to perform relevant gestures are generally referred to as a "control object." For instance, the user may express a command using their entire body or with other physical objects, in which case their entire body or the other physical objects may be the control object. A user may more subtly express a command by blinking their eye, by flaring their nostrils, or by wiggling a finger, in which case the eyelid, nose, or finger may be the control object. A control object may also be a physical device, such as an infrared finger light, a mobile device, a wrist-watch device, a retro-reflector, or a remote control, to name a few examples.

There are many ways of determining a users gesture from motion data. For instance, the gesture of "drawing a circle in the air" or "swiping the hand off to one side" may be detected by a gesture analysis and detection process using the hand, arm, body, head or other object position information. Although the gesture may involve a two- or three-dimensional position displacement, such as when a swiping gesture is made, in other instances the gesture includes a transformation without a concomitant position displacement. For instance, if a hand is signaling "stop" with five outstretched fingers and palm forward, the gesture of the user changes if all five fingers are retracted into a ball with the palm remaining forward, even if the overall position of the hand or arm remains static.

Gestures may be detected using heuristic techniques, such as by determining whether hand or device position information passes explicit sets of rules. For example, the gesture of "swiping the hand off to one side" may be identified if the following gesture detection rules are satisfied: (1) the change in horizontal position is greater than a predefined distance over a time span that is less than a predefined limit; (2) the horizontal position changes monotonically over that time span; (3) the change in vertical position is less than a predefined distance over that time span; and (4) the position at the end of the time span is nearer to (or on) a border of the hand detection region than the position at the start of the time span.

Some gestures utilize multiple rule sets that are executed and satisfied in an explicit order, where the satisfaction of a rule set causes a system to change to a state where a different rule set is applied. This system may be unable to detect subtle gestures, in which case Hidden Markov Models may be used, as these models allow for chains of specific motions to be detected, but also consider the overall probability that the motions sufficiently fit a gesture.

So as to enable the input of complex commands and to increase the number of input options, the process for recognizing the user's gesture may further include recognizing a first displacement in a first direction, and recognizing a second displacement in a second direction, and aggregating these multiple displacements as a single gesture. Furthermore, the recognition of the user's gesture may determine a magnitude and direction of the user's gesture.

Returning to FIG. 3, if it is determined that the moving object has performed a gesture, an application is controlled (S310), thereby ending the process 300 (S312). To name a few examples, volume may be increased on a media player, an application may be launched, an application or a device may be shut down, or an email message may be sent. A function to perform in response to a gesture may be determined, for example, by querying a mapping database which maps gestures to functions. The number of waves detected may be provided as input to a performed function. For example, a detected number of waves may be provided as an input to a "speed-dialing" function, with the wave count identifying a telephone call or text message recipient.

Figure 9:
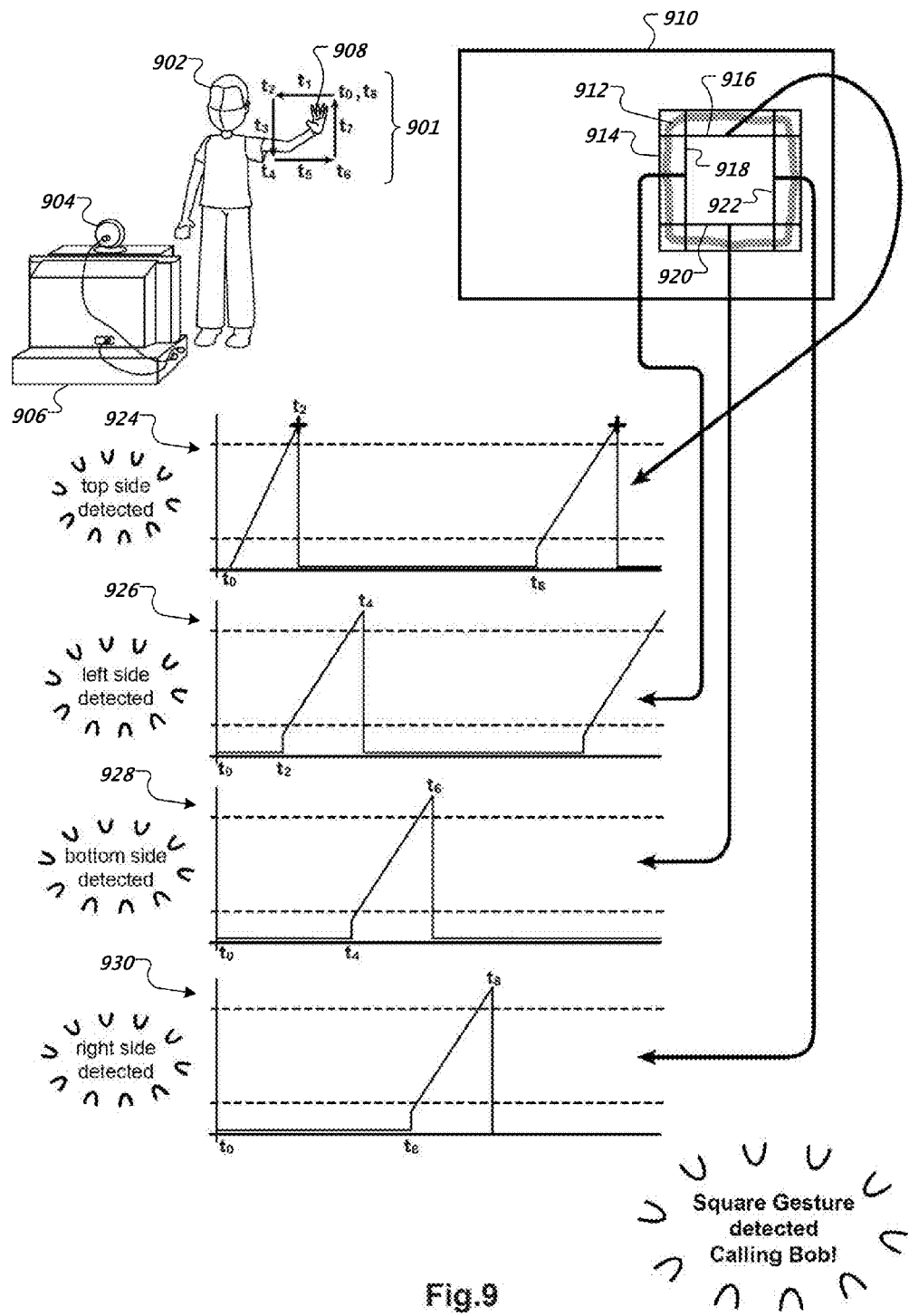
FIG. 9 illustrates gesture detection.

FIG. 9 illustrates the detection of a square-shaped gesture 901. A user 902 is standing in front of a camera 904 and a media hub 906. The user 902 moves their left hand 908 in the square-shaped gesture 901. Between time points $t_0$ and $t_2$, the user 102 moves their hand 908 from right to left (from the reader's perspective). Between the time point $t_2$ and a time point $t_4$, the user 102 moves their hand 908 in a downward direction. Between the time point $t_4$ and a time point $t_6$, the user 102 moves their hand 908 from left to right. Between the time point $t_6$ and a time point $t_8$, the user 102 moves their hand 908 in an upward direction, with the hand 908 finishing where it started at the time point $t_0$.

A motion history map 910 includes a group of detected points 912 inside of a bounding box 914. Line segments 916-922 have been inscribed inside the group of points 912. For each of the line segments 916-922, detected hand positions may be detected over time. Detected hand positions may be plotted on graphs 924-930, with each graph 924-930 associated with one of the line segments 916-922.

For example, the graph 924 plots hand positions detected along the horizontal line segment 916 (i.e., corresponding to the top of the square gesture 901). The graph 926 plots hand positions detected along the vertical line segment 918 (I.e., corresponding to the left side of the square gesture 901). The graph 928 plots hand positions detected along the horizontal line segment 920 (i.e., corresponding to the bottom of the square gesture 901). The graph 930 plots hand positions detected along the vertical line segment 922 (i.e., corresponding to the right side of the square gesture 901).

The graph 924 illustrates hand positions detected along the horizontal line segment 916, over time. Positions may be defined such that a position value of "0%" indicates a position on the far right side of the line segment 916 and a position value of "100%" indicates a position on the far left side of the line segment 916. For example, and as shown in graph 924, at the time point to, the user's hand 908 is at the far right of the line segment 916 (i.e., a position of 0%), and at the time point $t_2$, the user's hand is at the far left of the line segment 916 (i.e., a position of 100%). At the time point $t_8$, the user's hand 908 is detected again on the far right side of the line segment 916 (i.e., a position of 0%).

The graph 926 illustrates hand positions detected along the vertical line segment 918, over time. Positions may be defined such that a position value of "0%" indicates a position at the top of the line segment 918 and a position value of "100%" indicates a position on the bottom of the line segment 918. For example, and as shown in graph 926, at the time point $t_2$, the user's hand 908 is at the top of the line segment 918 (i.e., a position of 0%), and at the time point $t_4$, the user's hand 908 is at the bottom of the line segment 918 (i.e., a position of 100%).

The graph 928 illustrates hand positions detected along the horizontal line segment 920, over time. Positions may be defined such that a position value of "0%" indicates a position at the far left of the line segment 920 and a position value of "100%" indicates a position at the far right of the line segment 920. For example, and as shown in graph 928, at the time point $t_4$, the user's hand 908 is at the far left of the line segment 920 (i.e., a position of 0%), and at the time point $t_6$, the user's hand 908 is at the far right of the line segment 920 (i.e., a position of 100%).

The graph 930 illustrates hand positions detected along the vertical line segment 922, over time. Positions may be defined such that a position value of "0%" indicates a position at the bottom of the line segment 922 and a position value of "100%" indicates a position at the top of the line segment 922. For example, and as shown in graph 930, at the time point $t_6$, the user's hand 908 is at the bottom of the line segment 922 (i.e., a position of 0%), and at the time point $t_8$, the user's hand 908 is at the top of the line segment 922 (i.e., a position of 100%).

The set of graphs 924-930 may be examined to determine whether the square gesture 901 has been performed. That is, each of the graphs 924-930 may be examined to determine whether each graph indicates that a sub-gesture corresponding to a respective side of the square gesture 901 occurred (such as by comparing the pattern exhibited by the graph to an expected graph pattern). If each of the graphs 924-930 indicate that a sub-gesture occurred, and if the graphs 924-930 align with each other with respect to timing considerations, then an overall determination may be made regarding the detection of the square gesture 901. If a square gesture is detected, an application may be controlled, such as placing a call to an individual in a contact list associated with the user 902.

Figure 10:
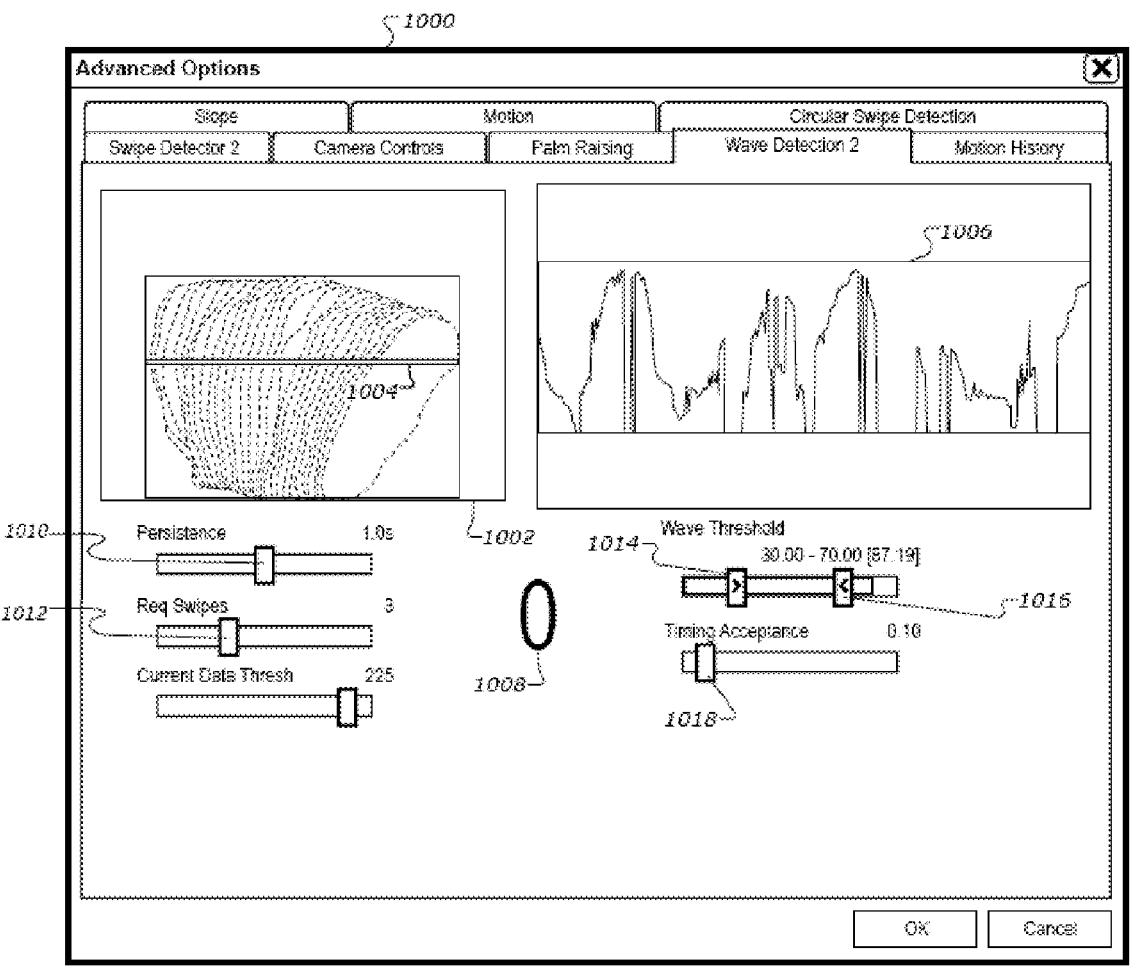
FIGS. 10-11 illustrate example user interfaces.

FIG. 10 is a user interface 1000 including a motion history map 1002 associated with a performed wave gesture. A line segment 1004 is inscribed inside of a bounding box which surrounds points indicating detected motion. A graph 1006 displays detected positions of a user's hand along the line segment 1002, over time. The shape of the graph 1006 has portions which look somewhat like a sinusoidal wave pattern, but a wave count label 1008 indicates that no wave gestures have been detected (perhaps due to the failure of one or more threshold tests).

The user interface 1000 includes controls which may be used for configuring gesture detection. For example, a control 1010 may be used to define a persistence value which controls the length of time before motion history values decay. As another example, a control 1012 may be used to define a required number of "swipes" (i.e., motion to one side in a back-and-forth motion) included in a wave gesture.

Other configuration control examples include high and low wave thresholds 1014-1016 and a timing acceptance 1018. The high and low wave thresholds 1014-1016 are percentages above (and below) which motion history data may pass in order to count as a wave segment. The timing acceptance 1018 is a multiplier by which each segment in a wave may be judged. With a timing acceptance value 1018 of 0.1, wave segments may be required to be within 90%-110% of the mean of other wave segments. With a timing acceptance value 1018 of 0.2, wave segments may be required to be within 80%-120%. In other words, a lower timing acceptance value 1018 corresponds to better timing consistency.

Figure 11:
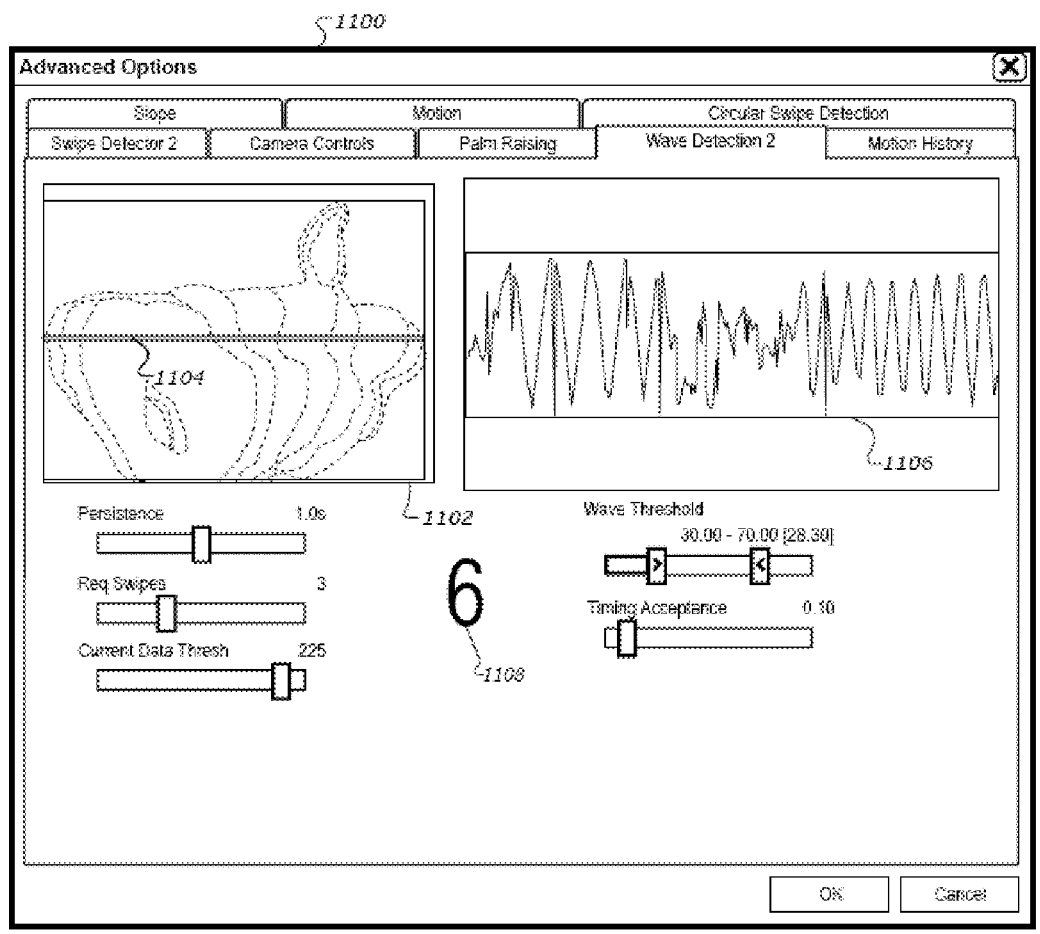

FIG. 11 is a user interface 1100 including a motion history map 1102 associated with a performed wave gesture. A line segment 1104 is inscribed inside of a bounding box which surrounds points indicating detected motion. A graph 1106 displays detected positions of a user's hand along the line segment 1102, over time. Portions of the graph 1106 exhibit a sinusoidal pattern. A wave count label 1108 indicates that six wave gestures have been detected.

Figure 12:
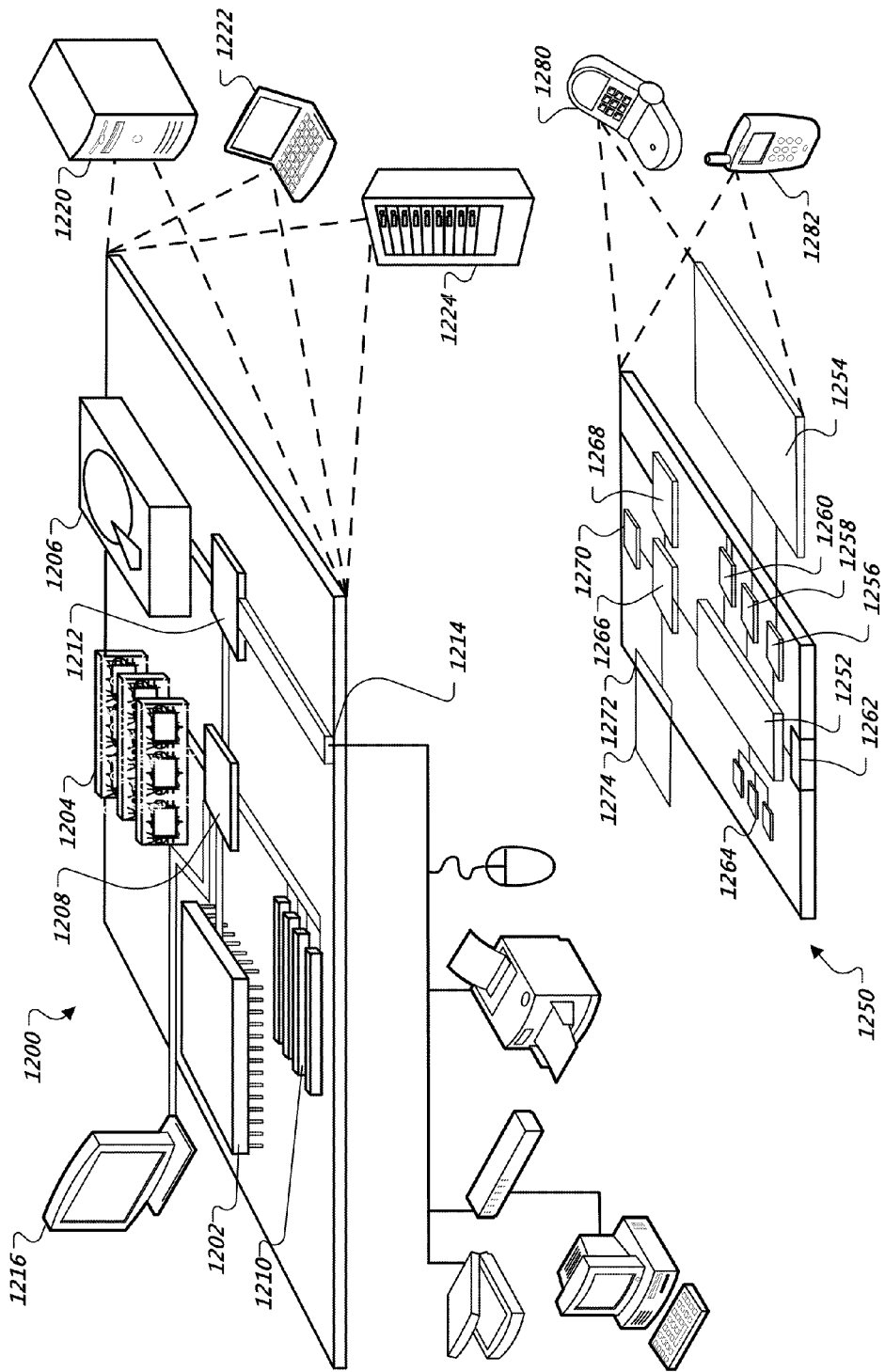
FIG. 12 illustrates exemplary computing devices.

FIG. 12 is a block diagram of computing devices 1200, 1250 that may be used to implement the systems and methods described in this document, as either a client or as a server or plurality of servers. Computing device 1200 is intended to represent various forms of digital computers, such as laptops, desktops, workstations, personal digital assistants, servers, blade servers, mainframes, and other appropriate computers. Computing device 1250 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the approaches described and/or claimed in this document.

Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. Each of the components 1202, 1204, 1206, 1208, 1210, and 1212, are interconnected using various busses, and may be mounted on a common motherboard or in other manners as appropriate. The processor 1202 may process instructions for execution within the computing device 1200, including instructions stored in the memory 1204 or on the storage device 1206 to display graphical information for a GUI on an external input/output device, such as display 1216 coupled to high speed interface 1208. In other implementations, multiple processors and/or multiple busses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a computer-readable medium. In one implementation, the memory 1204 is a volatile memory unit or units. In another implementation, the memory 1204 is a non-volatile memory unit or units.

The storage device 1206 is capable of providing mass storage for the computing device 1200. In one implementation, the storage device 1206 is a computer-readable medium. In various different implementations, the storage device 1206 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1204, the storage device 1206, or memory on processor 1202.

The high speed controller 1208 manages bandwidth-intensive operations for the computing device 1200, while the low speed controller 1212 manages lower bandwidth-intensive operations. Such allocation of duties is exemplary only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device 1250. Each of such devices may contain one or more of computing devices 1200, 1250, and an entire system may be made up of multiple computing devices 1200, 1250 communicating with each other. The computing device 1200 may include one or more sensors (not shown), such as gyroscopes, cameras or GPS (Global Positioning Satellite) trackers, configured to detect or sense motion or position of the computing device 1200.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various busses, and several of the components may be mounted on a common motherboard or in other manners as appropriate. The computing device 1250 may include one or more sensors (not shown), such as gyroscopes, cameras or GPS (Global Positioning Satellite) trackers, configured to detect or sense motion or position of the computing device 1200.

The processor 1252 may process instructions for execution within the computing device 1250, including instructions stored in the memory 1264. The processor may also include separate analog and digital processors. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT LCD display or an OLED display, or other appropriate display technology. The display interface 1256 may include appropriate circuitry for driving the display 1254 to present graphical and other information to a user. The control interface 1258 may receive commands from a user and convert them for submission to the processor 1252. In addition, an external interface 1262 may be provided in communication with processor 1252, so as to enable near area communication of device 1250 with other devices. External interface 1262 may provide, for example, for wired communication (e.g., via a docking procedure) or for wireless communication (e.g., via Bluetooth or other such technologies).

The memory 1264 stores information within the computing device 1250. In one implementation, the memory 1264 is a computer-readable medium. In one implementation, the memory 1264 is a volatile memory unit or units. In another implementation, the memory 1264 is a non-volatile memory unit or units. Expansion memory 1274 may also be provided and connected to device 1250 through expansion interface 1272, which may include, for example, a SIMM card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provide as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, or memory on processor 1252.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, WiFi, or other such transceiver (not shown). In addition, GPS receiver module 1270 may provide additional wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in the figure. For example, it may be implemented as a cellular telephone 1280. It may also be implemented as part of a smartphone 1282, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the systems and techniques described here), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A non-transitory computer-readable storage medium encoded with instructions that, when executed, operate to cause a computer to perform operations comprising:
    defining a shape corresponding to a gesture within motion data;
    sampling the motion data at points that are aligned with the defined shape;
    determining, based on the sampled motion data, positions of a moving object along the defined shape, over time, wherein determining the positions occurs subsequent to defining the shape;
    determining whether the moving object is performing the gesture based on a pattern exhibited by the determined positions; and
    controlling an application if determining that the moving object is performing the gesture.

2. The computer-readable storage medium of claim 1, wherein:
    the motion data comprises a motion history map further comprising motion history data values that provide, for each point of an image, an indication of time since the moving object was detected at the point.

3. The computer-readable storage medium of claim 2, wherein determining the positions of the moving object along the defined shape, over time, further comprises:
    at first and second times:
        selecting points that are aligned with the defined shape and that comprise sampled motion history data values which satisfy a predetermined threshold, and
        selecting one of the selected points; and
    outputting, as first and second positions of the moving object, the one points respectively selected at the first and second times.

4. The computer-readable storage medium of claim 3, wherein the one point comprises a median, mean, or random point of the selected points.

5. The computer-readable storage medium of claim 4, wherein the motion history map is generated using optical flow.

6. The computer-readable storage medium of claim 2, further comprising instructions that, when executed, operate to cause the computer to perform operations comprising:
    accessing the image; and
    generating the motion history map based on the accessed image.

7. The computer-readable storage medium of claim 2, wherein the pattern comprises a shape of one period of a sinusoid on a graph of the determined positions over time, the determined positions expressed as a proportion of a single dimension of the shape.

8. The computer-readable storage medium of claim 2, wherein the pattern comprises a shape of one period of a stepped sinusoid on a graph of the determined positions over time, the determined positions expressed as a proportion of a single dimension of the shape.

9. The computer-readable storage medium of claim 2, further comprising instructions that, when executed, operate to cause the computer to perform operations comprising:
    determining, for each point, whether the moving object has been detected within a predetermined threshold; and
    grouping adjacent points determined to have detected motion of the moving object within the predetermined threshold,
    wherein the motion data is sampled at a subset of the grouped points that are aligned with the defined shape.

10. The computer-readable storage medium of claim 9, further comprising instructions that, when executed, operate to cause the computer to perform operations comprising:
    defining a bounding box around the grouped points,
    wherein a size and a location of the shape within the motion data are defined with respect to the bounding box.

11. The computer-readable storage medium of claim 10, wherein:
    the shape comprises a line segment or a chord.

12. The computer-readable storage medium of claim 10, wherein the shape comprises a longest line segment capable of fitting within the grouped points.

13. The computer-readable storage medium of claim 1, further comprising instructions that, when executed, operate to cause the computer to perform operations comprising:
    detecting groups of points within the motion data; and
    selecting one of the groups of points,
    wherein the shape is defined within the one selected group.

14. The computer-readable storage medium of claim 13, wherein the one group is selected based on relative size.

15. The computer-readable storage medium of claim 1, wherein:
    the motion data is sampled at a sampled quantity of points that are aligned with the defined shape, and
    the sampled quantity comprises a fixed quantity or is based on a size of the defined shape or an aligned quantity of points that are aligned with the defined shape within the motion data.

16. The computer-readable storage medium of claim 1, wherein determining whether the moving object is performing the gesture based on the pattern exhibited by the determined positions further comprises comparing the pattern to upper and lower threshold criteria and to timing criteria.

17. The computer-readable storage medium of claim 1, wherein the gesture comprises a swiping or waving, hand or finger gesture.

18. The computer-readable storage medium of claim 1, further comprising instructions that, when executed, operate to cause the computer to perform operations comprising:
    adding the determined positions to a motion history, and
    detecting whether the pattern exists within the motion history.

19. The computer-readable storage medium of claim 1, further comprising instructions that, when executed, operate to cause the computer to perform operations comprising:
    counting a quantity of performances of the gesture.

20. The computer-readable storage medium of claim 1, wherein at least one dimension of the shape is defined based on detected positions of the moving object at two or more different times.

21. The computer-readable storage medium of claim 1, wherein the shape comprises a first shape of a plurality of shapes, wherein each shape of the plurality of shapes corresponds to a gesture.

22. A computer-implemented method comprising:
defining a shape corresponding to a gesture within motion data;
sampling the motion data at points that are aligned with the defined shape;
determining, based on the sampled motion data, positions of a moving object along the defined shape, over time, wherein determining the positions occurs subsequent to defining the shape;
determining whether the moving object is performing the gesture based on a pattern exhibited by the determined positions; and
controlling an application if determining that the moving object is performing the gesture.

23. A device comprising a processor configured to:
define a shape corresponding to a gesture within motion data;
sample the motion data at points that are aligned with the defined shape;
determine, based on the sampled motion data, positions of a moving object along the defined shape, over time, wherein the positions are determined subsequent to the shape being defined;
determine whether the moving object is performing the gesture based on a pattern exhibited by the determined positions; and
control an application if determining that the moving object is performing the gesture.

24. A system comprising:
means for defining a shape corresponding to a gesture within motion data;
means for sampling the motion data at points that are aligned with the defined shape;
means for determining, based on the sampled motion data, positions of a moving object along the defined shape, over time, wherein the means for determining comprise means for determining the positions subsequent to the shape being defined;
means for determining whether the moving object is performing the gesture based on a pattern exhibited by the determined positions; and
means for controlling an application if determining that the moving object is performing the gesture.

* * * * *